United States Patent [19]

Volland et al.

[11] Patent Number: 4,618,532
[45] Date of Patent: Oct. 21, 1986

[54] UPHOLSTERED SEAT HAVING AN AIR-PERMEABLE COVERING AND A COLD FOAM CORE

[75] Inventors: Robert Volland, Leverkusen; Hans-Albrecht Freitag, Bergisch Gladbach; Johannes Seesing, Leverkusen; Herbert Bergmann, Kuerten-Broich, all of Fed. Rep. of Germany

[73] Assignee: Bayer Aktiengesellschaft, Leverkusen, Fed. Rep. of Germany

[21] Appl. No.: 641,118

[22] Filed: Aug. 15, 1984

[30] Foreign Application Priority Data

Aug. 26, 1983 [DE] Fed. Rep. of Germany ....... 3330760

[51] Int. Cl.$^4$ .............................................. B32B 3/26
[52] U.S. Cl. ...................................... 428/304.4; 5/481; 428/71; 428/76; 428/309.9; 428/314.4
[58] Field of Search ................... 428/304.4, 316.6, 71, 428/76, 309.9, 314.4, 314.8, 317.5; 5/448, 481

[56] References Cited

U.S. PATENT DOCUMENTS

| | | | |
|---|---|---|---|
| 3,246,621 | 4/1966 | Copeland | 428/316.6 |
| 3,258,511 | 6/1966 | McGregor, Jr. | 264/46.4 |
| 3,431,331 | 3/1969 | Pincus et al. | 264/46.4 |
| 3,932,252 | 1/1976 | Woods | 156/245 |
| 4,544,598 | 10/1985 | Meiller et al. | 428/316.6 |

FOREIGN PATENT DOCUMENTS 1427619  3/1976  United Kingdom .

Primary Examiner—William J. Van Balen
Attorney, Agent, or Firm—Gene Harsh; Joseph C. Gil; Aron Preis

[57] ABSTRACT

The present invention is directed to an upholstered seat consisting of an in situ foam core based on a cold foam formulation and an air-permeable covering and to a process for integrally producing an upholstered seat with improved standards of comfort by back foaming a covering material in a mold, characterized in that, in a split mold of which the dividing plane preferably extends in the vicinity of the actual seat surface, a sealed foam-impermeable covering material is applied to the internal contour of the mold and that part of the covering material which forms the actual seat surface is clamped in the dividing plane of the mold, the entire mold cavity is filled with foam by metering the foam in correspondingly large quantities, after which the sealing layer around the fully reacted foam core, where it consists of an air-impermeable material, is destroyed by a mechanical treatment, such as needle punching, flexing, compression, knocking, or by solvents to at least such an extent that it becomes permeable to air.

4 Claims, 4 Drawing Figures

UPHOLSTERED SEAT HAVING AN AIR-PERMEABLE COVERING AND A COLD FOAM CORE

BACKGROUND OF THE INVENTION

This invention relates to upholstered seats consisting of an in situ foam core based on a cold foam formulation and of a covering which may contain more than one layer and to a process for producing an upholstered seat with improved standards of comfort by back foaming the covering material in a mold.

In upholstered seats, the foam core and the seat covering (seat cover) are often produced in separate operations, the seat cover subsequently being fastened to the back of the cushion or to the cushion support. Sewing the seat cover and covering the foam core are expensive and labor-intensive operations.

German Pat. No. 2,227,143 describes a directly back-foamed upholstered seat consisting of a textile covering with a sealing layer and an in situ foam core. The sealing layer is impermeable to foam and air. To produce a directly back-foamed upholstered seat such as this, a covering backed by an elastic, sealing film is introduced into a vacuum forming mold, deep drawn and the empty space filled with foam. Deep drawing is necessary both for fixing the covering and for forming the exact contour of the upholstered seat. One of the disadvantages of upholstered seats of this type lies in the fact that the dissipation of heat and moisture is prevented by the air-impermeable film. As a result, the temperature of the seat when it is in use very quickly approaches body temperature, which is uncomfortable for the person sitting on the seat.

Hitherto, positioning of the covering material in the mold used for in situ back foaming has been achieved by applying a vacuum to an air-impermeable covering material, so that the covering readily developed creases, accompanied by poorly developed contours. In particular, difficulties were involved in exactly aligning a patterned covering material. Typical of such processes are those in U.S. Pat. Nos. 3,258,511, 3,431,331 and 3,932,252.

DESCRIPTION OF THE INVENTION

Figure 1:
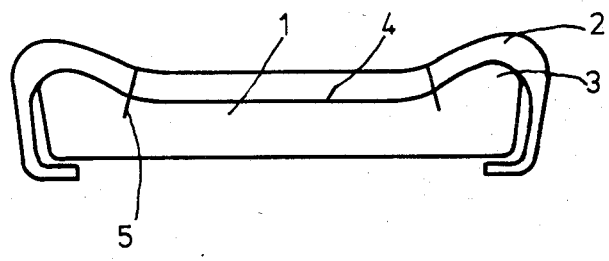
FIG. 1 is a section through an upholstered seat.

The present invention is directed to an upholstered seat which is formed complete with the covering during the foaming process and which offers better standards of comfort because it has an airpermeable surface. The invention is also directed to a process by which upholstered seats can be produced by filling with foam without the covering having to be fixed in the mold by deep drawing. The process is characterized in that, in a split mold, of which the dividing plane preferably extends in the vicinity of the actual seat surface, a sealed foam-impermeable covering material is applied to the internal contour of the mold and that part of the covering material which forms the actual seat surface is clamped, preferably under tension, in the dividing plane of the mold. The entire mold cavity is then filled with foam by metering the foam in correspondingly large quantities. Where the sealing layer consists of an air-impermeable material, it is destroyed by a mechanical treatment, such as needle punching, flexing compression, knocking, or by solvents to at least such an extent that it becomes permeable to air. The present invention also relates to an upholstered seat of the type described which is characterized in that the covering is permeable to air from the outset.

It has been found that, by clamping the covering in the dividing plane of the mold, which is preferably situated in the vicinity of the actual seat area, precise back foaming is possible.

Since permeability to air also implies permeability to water vapor, heat and moisture can be dissipated through the exchange of air through the covering compared with the prior art, an upholstered seat of the type in question, for example as a car seat, is characterized by considerably better performance properties.

Basically, known cold-foam formulations may be used for producing the foam core. Cold molded foam generally has closed cells. It can be given a greater number of open cells by kneading, flexing, etc.

The connection between the covering and the foam core is preferably strengthened by means of straps which are fixed to the back of the covering (for example by clips, stitching, bonding or welding) and which project therefrom. During the foaming process, the straps are joined to the foam core with the result that the covering is unable to slip because it is anchored in the foam. This ensures, particularly in concave regions of the seat, that the covering follows the concave form. Accordingly, there is no need for wire inserts, which in known upholstered seats, are held by wire pins inserted into straps provided on the covering.

In most cases, the covering of the upholstered seat comprises several layers. It has to be impermeable to foam, i.e. during the foaming process. The elastic, preferably textile covering has to be pressed against the mold wall by the expanding foam, although the foam must not be visible anywhere from outside. On the contrary, the reaction mixture should penetrate to the least possible extent on the inside of the covering, so that the foam is minimally compressed or hardened around the edges of the foam core. There are several ways of making the covering permeable to air in the finished upholstered seat. The sealing layer itself may be impermeable to air during the production process, but may subsequently be destroyed without difficulty. Suitable sealing materials are, for example, paper or paper-like products which are preferably surface-finished.

It is also possible, however, to make the covering impermeable to air and foam by using a sealing layer which is permeable to air from the outset. The covering may be provided internally with a foam-repellent finish, for example by the application of tertiary amines or tin catalysts or strong silicone stabilizers. Suitable tertiary amines include, for example, triethylene diamine and bis-dimethylaminoethyl ether. Suitable tin compounds include, for example, dibutyl tin dilaurate. The penetration and collapse of the foam can be prevented by strong stabilizers which are generally not used in cold foams due to their extreme effectiveness, but instead are used in the manufacture of hot foam or, for example, closed-cell rigid foam. Another method of providing the covering with a foamimpermeable sealing layer is based on impregnation with grease- and foam-repellent substances, such as perfluoroalkanes, which are already used for the dirt-repellent finishing of consumer goods. The permeability to air and impermeability to foam provided by a sealing layer which is permeable to air from the outset may also be achieved by ensuring that, on coming into contact with the covering, the foam is so thick-flowing that it is unable to penetrate through the covering. This result may be achieved by using a foam formulation which foams at a very early stage on introduction of the foam reaction mixture and rapidly increases in viscosity (through intensified catalysis with tertiary amines for example, increased starting material temperatures or by using special additives, such as pyrocarbonic acid (frothing process)). The same effect is obtained by applying measures to increase foam stability, for example, by using strong silicone stabilizers. These measures may be applied either individually or in combination. The effect of these measures is that a covering which is permeable to air from the outset is not penetrated by the back foaming process. The foam is not overly compressed nor does it collapse to form a compact polymer. Impregnation itself may be carried out on the coating prepared for back foaming or on web-form material by spray coating, spread coating, knife coating or similar techniques. The actual active substances may be suitably prepared for the impregnation process by the use of solvents, thickeners and other auxiliaries.

In cases where the foam does not adhere firmly and permanently to the back of the covering, it is necessary, particularly if the upholstered seat has concave areas, additionally to anchor the covering in the core, the straps described above being particularly suitable for that purpose.

The lateral parts of the seat cover or lateral parts hanging down from the actual seat surface are fixed to the back of the seat or to the seat support by methods known per se, for example using clips.

In general, the covering comprises several layers. The outermost visible layer is generally formed by a preferably textile, elastic covering material. So far as its pattern is concerned, this layer has to be adapted exactly to the form of the seat and should not be soiled by the foam. A bonded fabric or sheet of foam is frequently laminated onto that layer. The bonded fabric contributes toward improved moisture dissipation. Absorbent acrylic fibers having a porous core (for example Dunova ® fiber) are particularly suitable. Foam-impermeable films may be fixed to the covering by bonding, flame lamination, welding etc. or may be formed by a coating applied by knife coating. It is also possible to use high frequency-weldable material (for example PVC, polyester foam, impregnated bonded fabrics).

After the foam core has reacted to completion, the permeability to air of the sealing layer frequently has to be increased or actually created. This may be done mechanically by needle punching, flexing, compressing or knocking. As a result of this treatment, the sealing layer is punctured and torn in many places. The sealing layer is preferably made of thin lightweight paper (for example 20 to 40 g/m²) consisting of longfiber material. An elastic paper (crepe paper corrugated in several directions) is also frequently used for this purpose because a covering with a layer such as this adapts itself more easily to the contours of the mold. It is preferred to use surface-finished papers, i.e., so-called release papers. The surface finish preferably consists of a silicone coating or polyethylene coating. The foam core develops a normal skin to the release paper.

The covering may also be made permeable to air by partly or completely dissolving the foam-impermeable film. One example of a suitable film is a polyvinyl alcohol film which can be dissolved by water or water vapor deposited on the finished seat.

By virtue of the fact that the covering is clamped in the dividing plane of the mold, it is only the upper part of the core which is firmly joined to the covering material. The covering hanging down at the sides has to be fixed to the back of the seat or to the seat support. Alternatively, a prefabricated seat cover may be back foamed. If the seat cover is stitched, it may be necessary to sew in strips of an elastic film in the vicinity of the seams. These strips form a foam-impermeable barrier around the thread. A highly elastic polyurethane film 0.5 mm thick has proved to be particularly suitable for this purpose.

To ensure that the covering stretches firmly without any creases over the sides of the foam core, a shrunk film may advantageously be used for this purpose. This shrunk film is tightened by heating after the back foaming process.

By virtue of the process according to the invention, the covering is precisely positioned in the mold and is held in that position. The covering is placed under tension by means of pins, adhesive tapes, tenter frames and the like. The covering is creasefree. The split mold is sealed off by the covering in the dividing plane.

So far as cold foaming is concerned, it is known that the foam can be produced under pressure (approximately 1 bar) by overpacking. This pressure is sufficient to adapt the inserted covering to the contour of the mold without creases forming in the vicinity of the actual seat surface.

A typical upholstered seat according to the invention is a car seat of the type shown in section in FIG. 1. The foam core 1 is surrounded on top and at its sides by a multilayer covering 2 which is fixed to the underneath of the core 1. The two elevations 3 forming the sides of the actual seat surface 4 are typical. To ensure that the covering is closely adapted to the core 1, even in the presence of concave curves, several straps 5 are provided in the vicinity of the actual seat surface 4, being stitched to the covering and firmly joined to the core 1 during the foaming process.

Figure 2:
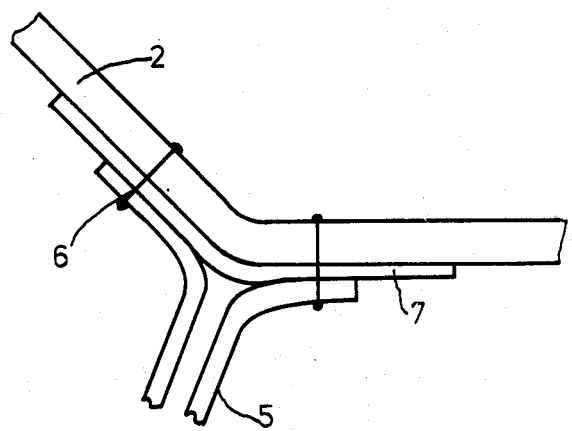
FIG. 2 shows a sewn-in strap plus film in the actual seat surface.

The fixing of a strap 5 to the covering 2 is shown more clearly in FIG. 2. In order to prevent the covering 2 with interliner from losing its impermeability to foam through the seams 6, this region is protected by a polyurethane film 7 which is also sewn on. The thread 6 drawn through the film 7 during sewing is tightly surrounded by the elastic film 7 after the needle has been withdrawn, so that the stitches are impermeable to foam.

In the embodiment illustrated, the covering 2 comprises several layers. The outermost layer is a polyamide textile and determines the appearance of the seat. Laminated to the underneath of this polyamide textile is a film of polyurethane foam which is also permeable to air and which is joined to a paper. This paper acts as a foam-impermeable barrier during the foaming process. By needle punching and flexing the finished seat, the paper is destroyed to such an extent that permeability to air is established.

In cases where the need for a separate foamimpermeable film is eliminated by particularly rapid hardening of the foam on the covering, the covering again consists for example of a polyamide textile as the uppermost layer with a bonded fabric immediately below, while the lowermost layer is for example a knitted polyamide fabric. Before the mold is closed, the back of the covering is sprayed with an active substance (for example bis-dimethylaminoethyl ether) which leads to an accelerated increase in viscosity and/or to increased foam stability, so that the foam does not penetrate through the covering material, is not overly compressed nor does it collapse to form a compact polymer. Although the rising foam presses the covering onto the wall of the mold, the foam does not enter the outer textile layer of the covering.

Figure 3:
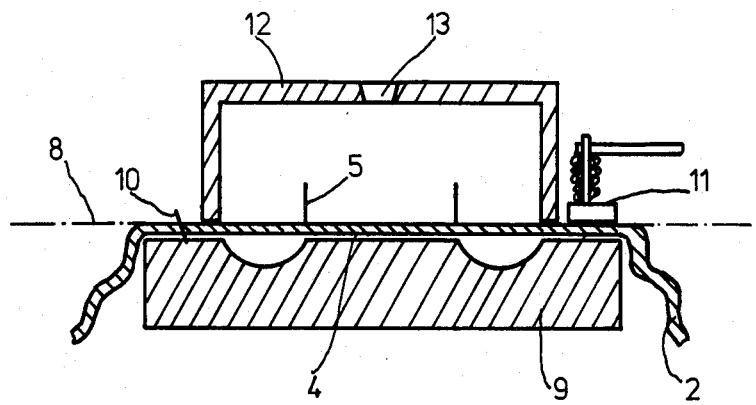
FIG. 3 is a section through a mold lined with covering material.

A mold by which the actual seat surface is joined to the covering material during the foaming process through the application of fresh reaction mixture to the covering in the bottom of the mold through a hole 13 in the cover 12 of the mold, is shown in section in FIG. 3. It is essential for the dividing plane 8 of the mold to be disposed in such a way that it extends through the edge which is formed by the actual seat surface 4 and the sides of the seat. In this way, the connection between the core and the cover is established in the vicinity of the actual seat surface 4 of the seat. By virtue of the fact that it is clamped in the dividing plane 8 of the mold, the covering can be exactly aligned. The base 9 of the mold delimits the actual seat surface 4. The elastic covering 2 is stretched tightly over the base 9 of the mold (pin 10 and clamp 11). The drawing also shows the straps 5 on the covering 2 projecting into the core. A hole 13 is provided in the upper part 12 of the mold for introducing the foam. A non-preformed covering 2 is used in the example shown in FIG. 3. However, it would also be possible to use a prefabricated seat cover.

Figure 4:
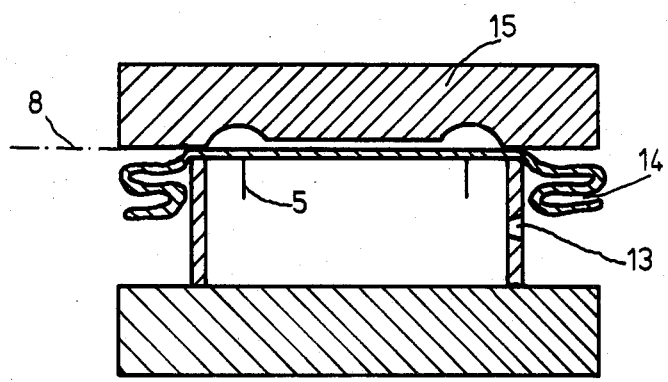
FIG. 4 is a section through a mold lined with the seat cover.

FIG. 4 shows a mold by which a seat cover 14 can be backed foamed by the reaction mixture being introduced into the mold cavity through a lateral hole 13 beneath the covering 14 and the rising foam being pressed against the covering in the upper part 15 of the mold only after the reaction has reached an advanced stage. In this case, the contour of the actual seat surface is in the upper part 15 of the mold, so that the dividing plane 8 of the mold in on top. The fact that the foam is introduced from beneath in one case and from above in the other case is merely intended to indicate various possibilities. In both cases, it is possible to use either a prefabricated seat cover or a non-preformed covering.

After removal from the mold, the seat is stitched and flexed. At the same time, the closed cells of the core are also broken open. It is sufficiently permeable to air.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An upholstered seat comprising:
  (a) an in situ foam core based on a cold foam formulation,
  (b) a foam-impermeable sealing layer which covers said foam core and which is selected from the group consisting of paper, paper-like products, and films which are capable of being dissolved, and
  (c) an air-permeable covering which covers said sealing layer.

2. The upholstered seat of claim 1 wherein straps are fixed to said covering.

3. An upholstered seat as claimed in claim 2, characterised in that, where the covering is stitched, elastic films are stitched on in the vicinity of the seams.

4. The upholstered seat of claim 1 wherein the covering of the sides of said seat is a shrunk film.

* * * * *